United States Patent
Confrey

(10) Patent No.: US 6,315,425 B1
(45) Date of Patent: *Nov. 13, 2001

(54) LIGHT ASSEMBLY REMOVABLY ATTACHABLE TO RADIO AND BATTERY ASSEMBLY

(75) Inventor: William J. Confrey, Pearl River, NY (US)

(73) Assignee: Lightsword, Inc., Pearl River, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,096

(22) Filed: Jan. 10, 2000

Related U.S. Application Data

(63) Continuation-in-part of application No. 09/173,588, filed on Oct. 15, 1998, now Pat. No. 6,050,694.

(51) Int. Cl.$^7$ .................................................. H04M 1/22
(52) U.S. Cl. .............................. 362/86; 362/190; 362/253; 455/74
(58) Field of Search ........................ 455/74, 344; 362/86, 362/234, 253, 190

(56) References Cited

U.S. PATENT DOCUMENTS

| | | | |
|---|---|---|---|
| D. 364,869 | 12/1995 | Lam | D14/168 |
| D. 381,100 | 7/1997 | Fink | D26/38 |
| 3,969,796 | 7/1976 | Hodsdon et al. | 24/270 |
| 4,045,663 | * 8/1977 | Young | 362/253 |
| 4,653,115 | 3/1987 | Holcomb | 455/128 |
| 4,703,402 | 10/1987 | Hsieh | 362/102 |
| 5,091,832 | 2/1992 | Tortola et al. | 362/109 |
| 5,109,322 | 4/1992 | Loughlin | 362/109 |
| 5,289,355 | 2/1994 | Cimock | 362/86 |
| 6,050,694 | * 4/2000 | Confrey | 362/86 |

* cited by examiner

Primary Examiner—Stephen Husar
(74) Attorney, Agent, or Firm—Fulbright & Jaworski, LLP

(57) ABSTRACT

A light assembly housing a light source is provided to be removably attachable to a radio unit designed to be removably attachable to a battery assembly. The light assembly may be positioned between the radio unit and battery assembly, and is capable of conducting power from the battery assembly to the radio unit.

27 Claims, 5 Drawing Sheets

LIGHT ASSEMBLY REMOVABLY ATTACHABLE TO RADIO AND BATTERY ASSEMBLY

This application is a continuation-in-part application of prior U.S. patent application Ser. No. 09/173,588, filed Oct. 15, 1998, now U.S. Pat. No. 6,050,694.

FIELD OF THE INVENTION

This invention relates to integration of a light source with a radio and power source.

BACKGROUND OF THE INVENTION

An item of equipment routinely carried by law enforcement officers is a two-way radio commonly referred to as a walkie talkie for reception and transmission of communications. In a typical configuration the radio is powered by a removably attachable battery assembly. When the battery pack is in the attached position positive and negative electrical contact is made between the terminals of the battery pack and the terminals of the radio. When the battery pack is removed it may be stored or recharged as needed. By designing the battery packs to be interchangeable, a radio may be powered by one battery pack while another battery pack is being recharged.

Another item of basic equipment carried by law enforcement officers in addition to a two-way radio is a portable light source such as a hand held flashlight. The flashlight is typically powered by batteries removably installed in a housing with terminals electrically connectable to an electric light bulb. The light from the light bulb is focused into a beam by a reflector and lens assembly.

Thus, a law enforcement officer carries a light source, a radio, and a separate power source for each. Since the light source and the radio could be powered simultaneously by a single power source, separate power sources are redundant. Moreover, since the light source and the radio are physically separate, they must occupy both hands of the officer if they are to be used simultaneously. This hampers the officer's flexibility, especially in critical situations when the officer's weapon must be drawn in self-defense or in defense of another.

Therefore, it would be desirable to provide an integrated light source and radio unit that can be held in one hand. It would also be desirable to provide a single power source to power both the light source and the radio in an integrated unit. Further, since resources for law enforcement equipment are limited, it is desirable to design a light source that can be integrated with existing radio and power source equipment.

SUMMARY OF THE INVENTION

It is therefore an object of the present invention to provide a light source that integrates easily with existing radio and power source equipment. It is also an object of the present invention to provide a single integrated light source and radio unit that can be held in one hand. A further object of the present invention is to provide a single power source to power both the light source and the radio in an integrated unit.

According to one aspect of the present invention, a light assembly is designed to be removably attachable to an existing radio unit that is designed to be removably attachable to a battery pack assembly. A first set of terminals of the light assembly are positioned to make electrical contact with a set of terminals of the radio unit when the light assembly is attached to the radio unit.

In one embodiment, the light assembly incorporates a light assembly power source that is compatible with the power requirements of both the light assembly and the radio unit. Thus, when the light assembly is attached to the radio unit, power from the light assembly power source internal to the light assembly is conducted to the terminals of the radio unit through the first set of terminals of the light assembly. The mechanism by which the light assembly is attached to the radio unit is designed to be identical to the mechanism by which the radio battery pack assembly is attached. In this way, the light assembly may be removed and replaced by the radio battery pack assembly which was designed therefor.

In an another embodiment, the light assembly does not comprise an internal power source. Instead, the light assembly is designed to be removably attachable to the radio battery pack assembly on a side opposite the side of the light assembly to which the radio is attached. In this configuration, a second set of terminals of the light assembly would make electrical contact with a set of terminals of the radio battery pack assembly when the light assembly is attached to the radio battery pack assembly. In this way, electrical power from the radio battery pack assembly is conducted to the light assembly. The power received at the second set of terminals of the light assembly from the radio battery pack assembly may be conducted to the first set of terminals of the light assembly and be thereby conducted to the radio unit to provide power therefor.

In yet another embodiment, the light assembly may be removably attachable to both the radio battery pack assembly and the radio unit, and comprise its own internal light assembly power source. In this configuration, the internal light assembly power source can provide power to the light assembly while the radio battery pack assembly provides power to the radio unit. Further, a switch can be provided to select between the light assembly power source and the radio battery pack assembly to provide power from either source to the light assembly and to the radio unit.

According to another aspect of the present invention, the light assembly comprises a light assembly adapter designed to be removably attachable to an existing radio unit and a light source electrically connected to the light assembly adapter. A first set of terminals of the adapter are positioned to make electrical contact with a set of terminals of the radio unit when the light assembly adapter is attached to the radio unit. Preferably, the light source is designed to be removably attachable to the radio unit.

In accordance with an embodiment of the present invention, the light assembly adapter includes an internal power source that is compatible with the power requirements of both the light source and the radio unit. When the light assembly adapter is attached to the radio unit, power from the internal power source is conducted to the terminals of the radio unit through the first set of terminals of the light assembly adapter. The light assembly adapter removably attaches to the radio unit substantially in the same manner as the battery pack assembly, thereby enabling the light assembly adapter to be removed and replaced by the battery pack assembly which was designed therefor.

In accordance with another embodiment of the present invention, the light assembly adapter does not include a separate internal power source. Instead, the light assembly adapter is designed to be removably attached to the battery pack assembly on a side opposite the side of the light assembly adapter to which the radio unit is attached. In this configuration, a second set of terminals of the light assembly adapter makes electrical contact with a set of terminals of the battery pack assembly when the light assembly adapter is attached to the battery pack assembly. In this way, the electrical power from the battery pack assembly is conducted to the light assembly adapter to power the light source. The electrical power received at the second set of terminals of the light assembly adapter from the battery pack assembly can be conducted to the first set of terminals of the light assembly adapter to provide electrical power to the radio unit.

In accordance with still another embodiment of the present invention, the light assembly adapter having an internal power source can be removably attached to both the radio unit and the battery pack assembly. In this configuration, the internal power source provides electrical power to the light source and the battery pack assembly provides electrical power to the radio unit. Further, the light source and the radio unit may selectively receive power from the internal power source and the battery pack assembly.

According to yet another aspect of the present invention, the light assembly is designed to be removably attachable to an existing radio unit via a universal connector on the radio unit. The universal connector is also used to removably attach any one of a number of remote radio accessories such as a public safety microphone, remote headset, etc. The light assembly is designed to be removably attachable to the universal connector of the radio unit using the same mechanism by which various remote radio accessories attach to the radio unit. A first set of terminals of the light assembly are positioned to make electrical contact with a set of terminals of the universal connector of the radio unit when the light assembly is attached to the radio unit.

Preferably, the light assembly includes a second set of terminals for removably attaching a given remote radio accessory to the light assembly. The second set of terminals of the light assembly is designed so that the remote radio accessory connects to the light assembly and the radio unit substantially in the same manner. The second set of terminals of the light assembly makes electrical contact with a set of terminals of a given remote radio accessory when the light assembly is attached to the universal connector of the radio unit.

In an embodiment, the light assembly includes an internal power source that is compatible with the power requirements of both the light assembly and the radio unit. When the light assembly is attached to the universal connector of the radio unit, power from the internal power source is conducted to the radio unit through the universal connector. Preferably, the electrical power from the internal power source is also conducted to the second set of terminals of the light assembly to thereby provide electrical power to the remote radio accessory connected to the light assembly.

In another embodiment, the light assembly does not include an internal power source. Instead, the electrical power from battery pack assembly is conducted to the light assembly via the universal connector to power both the radio unit and the light assembly. Preferably, the power received at the first set of terminals of the light assembly from battery pack assembly via the universal connector is further conducted to the second set of terminals of the light assembly to thereby provide power to the remote radio accessory connected to the light assembly.

In still yet another embodiment, the light assembly having internal power source can be removable attached to the universal connector of the radio unit with a removably attachable battery pack assembly. In this configuration, the internal power source provides power to the light assembly and the battery pack assembly provides power to the radio unit. Preferably, the internal power source also provides power to the remote radio accessory connected to the light assembly. Further, the light assembly and the radio unit may selectively receive power from the internal power source and the battery pack assembly.

Various other objects, advantages and features of the present invention will become readily apparent from the ensuing detailed description, and the novel features will be particularly pointed out in the appended claims.

Brief Description of the Drawings

The following detailed description, given by way of example, and not intended to limit the present invention solely thereto, will best be understood in conjunction with the accompanying drawings in which.

DETAILED DESCRIPTION OF THE PREFERRED EMBODIMENTS

Figure 1:
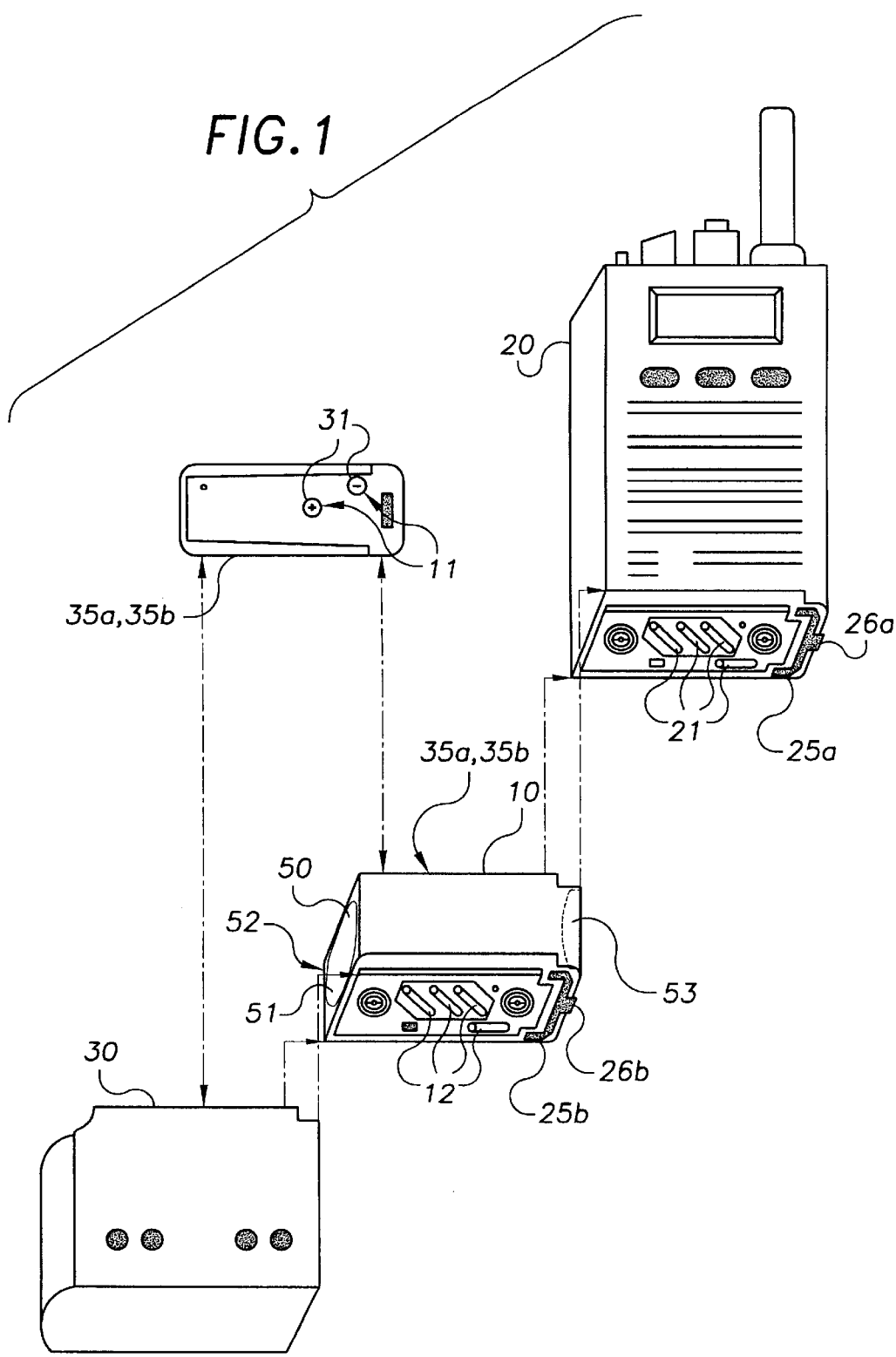
FIG. 1 is a drawing showing an embodiment of the present invention wherein a light assembly is removably attachable to the radio unit and conducts power from the battery pack assembly to the radio unit.

An embodiment of the present invention is illustrated in FIG. 1, wherein a light assembly 10 is designed to be removably attachable to a "walkie-talkie" radio unit 20 and a battery pack assembly 30.

In FIG. 1, the light assembly 10 is shown as being removably attachable to a Motorola radio unit 20 and its corresponding battery pack assembly 30. The battery pack assembly 30 is designed to be removably attachable to the radio unit 20. The mechanism for attachment of the light assembly 10 to the radio unit 20 is identical to the mechanism for attachment of the battery pack assembly 30 to the radio unit 20. Similarly, the mechanism for attachment of the light assembly 10 to the battery assembly 30 is identical to the mechanism for attachment of the radio unit 20 to the battery assembly 30.

In the case of the Motorola unit shown in FIG. 1, a slide mechanism 35a on the battery assembly 30 is designed to cooperatively and securely mate with a corresponding slide mechanism 25a on the radio unit 20 or identical slide mechanism 25b on the light assembly 10. Similarly, slide mechanism 35b on the light assembly 10 is identical to slide mechanism 35a on the battery assembly 30 and cooperatively and securely mates with corresponding slide mechanism 25a on the radio unit 20.

A release latch 26a is provided to release the battery assembly 30 when it is to be removed from the radio unit 20. The release latch 26a also provides for the release of the light assembly 10 from the radio unit 20. Similarly, a release latch 26b, which is identical to the release latch 26a, is provided to release the battery assembly from light assembly 10.

Figure 2:
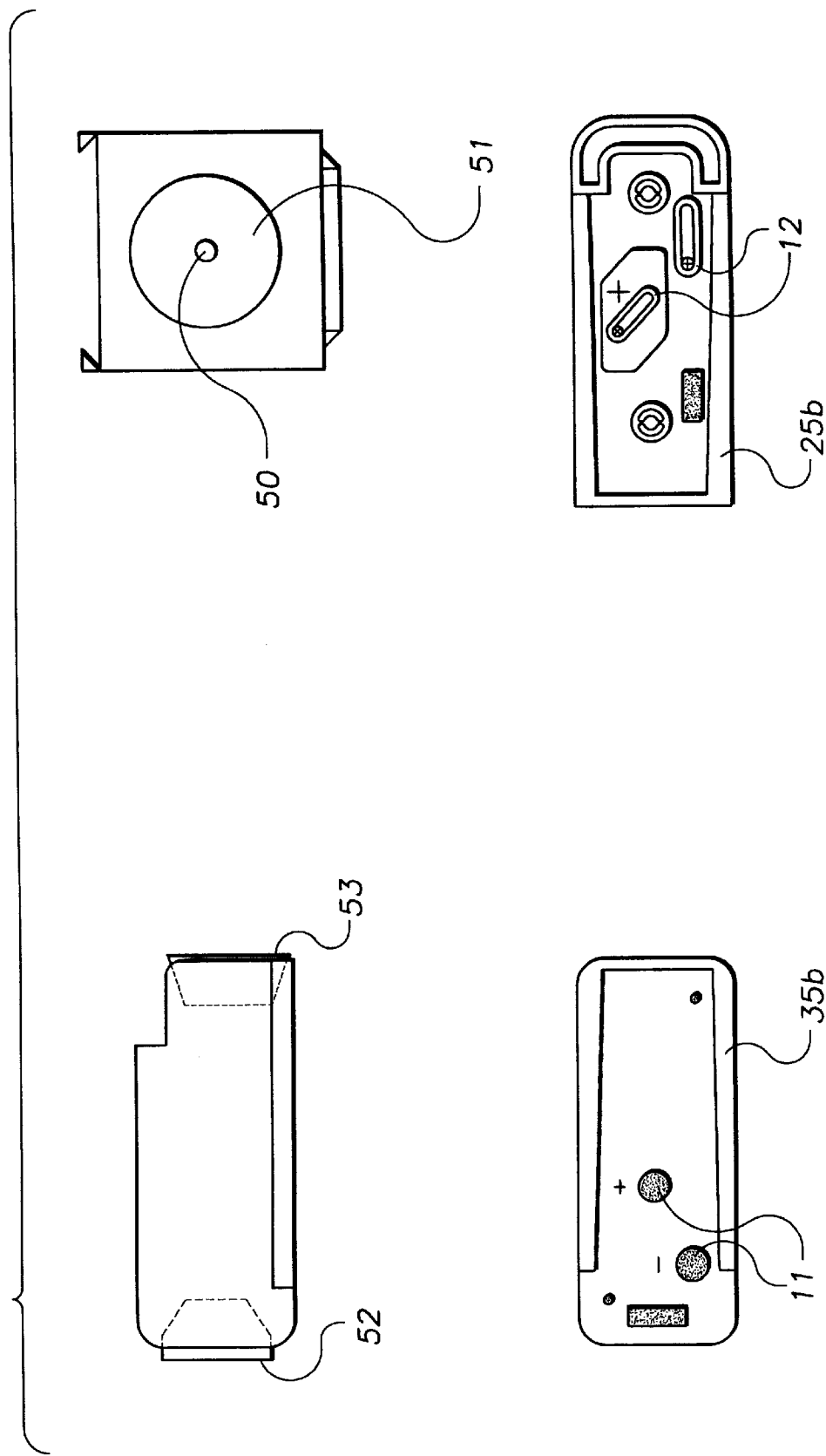
FIG. 2 is a drawing showing alternative views of the light assembly of FIG. 1.

A first set of contacts 11, as shown in FIG. 2, are positioned to make electrical contact with the set of contacts 21 of the radio unit 20 when the radio unit 20 is attached to the light assembly 10. A second set of contacts 12, also shown in FIG. 2, are positioned to make electrical contact with the set of contacts 31 of the battery pack assembly 30 when the battery assembly 30 is attached to the light assembly 10. Internal to light assembly 10, the first set of contacts 11 are electrically connected to the second set of contacts 12, to enable conduction of power from the battery assembly 30 to the radio unit 20. Thus, the light assembly 10 is designed to be easily integrated with existing radio and battery units. Persons of ordinary skill in the art would readily recognize how to construct attachment mechanisms for the light assembly 10 to cooperatively and securely mate with the radio unit and the battery assembly of various manufacture.

The light assembly 10 comprises a light source 50. The light source 50 may be any single source or multiple sources of light known in the art or that may be developed that is capable in terms of size and power requirements to be integrated with a radio unit and battery assembly. Typically, the light source 50 will comprise an electric light bulb that may be powered by conventional batteries. The light assembly 10 will further typically comprise a reflector 51 and lens 52 to focus light from light source 50 to a concentrated light beam. An on/off switch 53 is provided to turn the light source 50 on or off as desired.

In an alternative embodiment, the light assembly 10 comprises an internal light assembly power source 60 (not shown) that is compatible with the power requirements of both the light assembly 10 and the radio unit 20. Thus, when the light assembly is attached to the radio unit 20, power from the light assembly power source 60 internal to the light assembly 10 is conducted to contacts 21 of the radio unit 20 through first set of contacts 11 of the light assembly 10. In one configuration comprising the light assembly power source 60, the side of light assembly 10 opposite the side of light assembly 10 attachable to the radio unit 20 is sealed by a light assembly package (not shown). The mechanism by which the light assembly 10 is attached to the radio unit 20 is designed to be identical to the mechanism by which the radio battery pack assembly 30 is attached to the radio unit 20. In this way, the light assembly 10 may be removed and replaced by the radio battery pack assembly 30 which was designed therefor.

In yet another alternative embodiment, the light assembly 10 having the internal light assembly power source 60 may be removably attachable to both the battery pack assembly 30 and the radio unit 20. In this configuration of the light assembly 10, the internal light assembly power source 60 can provide power to the light source 50 while the battery pack assembly 30 provides power to the radio unit 20. Further, a switch (not shown) can be provided to select between the light assembly power source 60 and the battery pack assembly 30 to provide power from either one to the light assembly 10, to the radio unit 20, or to both.

Figure 3:
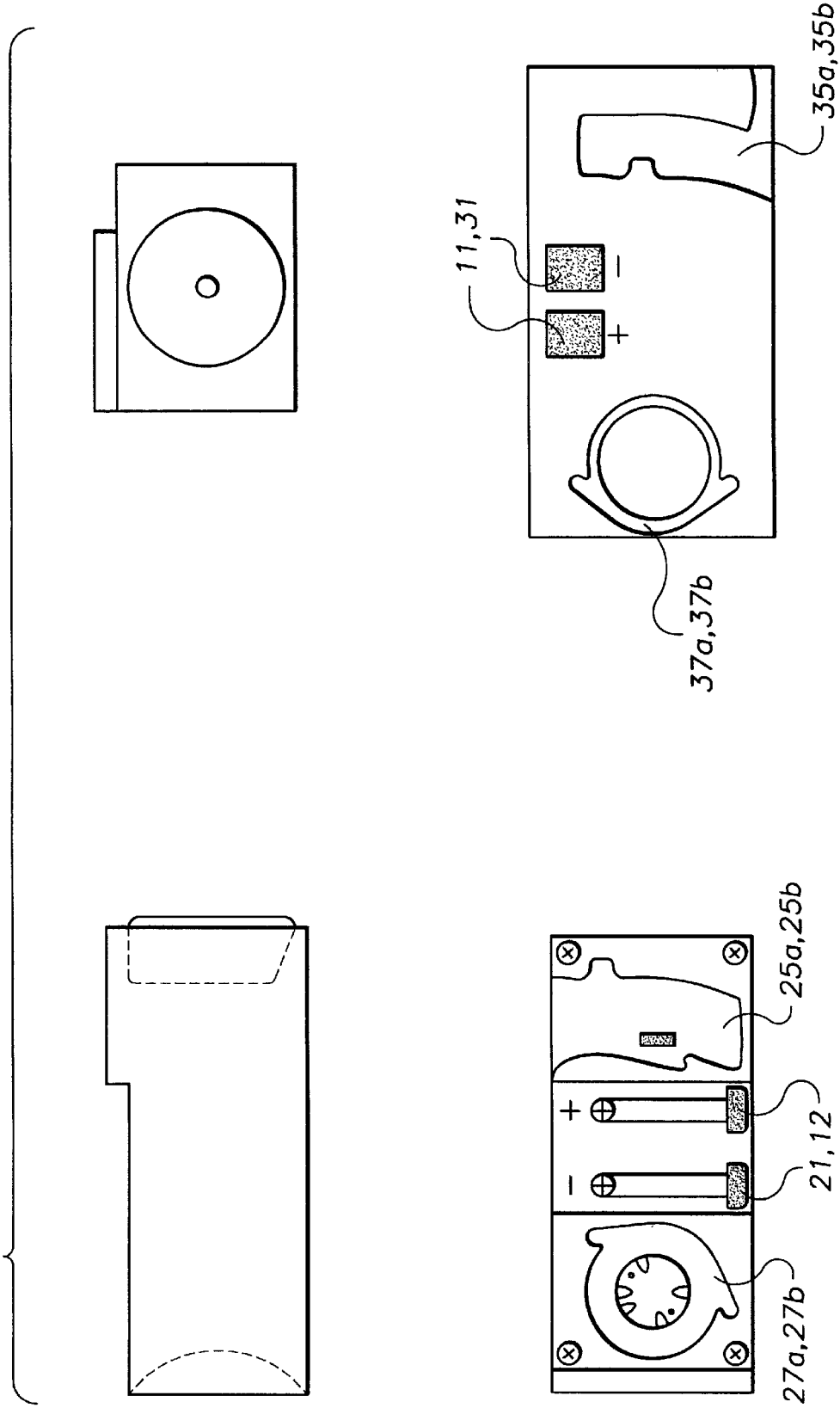
FIG. 3 is a drawing showing alternative views of another embodiment of the present invention;.

FIG. 3 illustrates the light assembly 10 configured to be removably attachable to a General Electric (G.E.) radio unit 20. A battery pack assembly 30 is designed to be removably attachable to the radio unit 20. The mechanism for attachment of the light assembly 10 to the radio unit 20 is identical to the mechanism for attachment of the battery assembly 30 to the radio unit 20. Similarly, the mechanism for attachment of the light assembly 10 to the battery assembly 30 is identical to the mechanism for attachment of the radio unit 20 to the battery assembly 30. Unlike the Motorola unit described above, the GE radio unit 20 is attached to the battery assembly 30 by way of a bayonet mechanism similar to the bayonet mechanism for attaching a lens onto a camera.

As illustrated in FIG. 3, the battery assembly 30 comprises a slide mechanism 35a designed to cooperatively and securely mate with a corresponding slide mechanism 25a on the radio unit 20 or identical slide mechanism 25b on the light assembly 10. Similarly, the slide mechanism 35b on the light assembly 10 is identical to the slide mechanism 35a on the battery assembly 30 and cooperatively and securely mates with corresponding slide mechanism 25a on the radio unit 10.

The battery assembly 30 also comprises a mount 37a which cooperatively mates with a corresponding mount 27a on the radio unit 20 or identical mount 27b on the light assembly 10. Similarly, mount 37b on the light assembly 10 is identical to mount 37a on the battery assembly 30 and cooperatively mates with mount 27a of radio unit 10.

To removably attach the battery assembly 30 to the radio unit 20, mount 37a is placed against mount 27a with the battery assembly 30 and the radio unit 20 at approximately right angles to a securely attached position. Then the battery assembly 30 and the radio unit 20 are rotated in opposite directions, while maintaining contact between mount 37a and 27a, to a position wherein the slide mechanism 35a and the slide mechanism 25a are securely and cooperatively mated.

To removably attach the battery assembly 30 to the light assembly 10, the mount 37a is placed against the mount 27b with the battery assembly 30 and the light assembly 10 at approximately right angles to a securely attached position. Then the battery assembly 30 and the light assembly 10 are rotated in opposite directions, while maintaining contact between mount 37a and 27b, to a position wherein the slide mechanism 35a and the slide mechanism 25b are securely and cooperatively mated.

To removably attach the light assembly 10 to the radio unit 20, the mount 37b is placed against the mount 27a with the light assembly 10 and the radio unit 20 at approximately right angles to a securely attached position. Then the light assembly 10 and the radio unit 20 are rotated in opposite directions, while maintaining contact between mount 37b and 27a, to a position wherein the slide mechanism 35b and the slide mechanism 25a are securely and cooperatively mated.

A first set of contacts 11, as shown in FIG. 3, are positioned to make electrical contact with the set of contacts 21 of the radio unit 20 when the radio unit 20 is attached to the light assembly 10. A second set of contacts 12, also shown in FIG. 2, are positioned to make electrical contact with the set of contacts 31 of the battery pack assembly 30 when the battery assembly 30 is attached to the light assembly 10. Internal to the light assembly 10, first set of contacts 11 are electrically connected to the second set of contacts 12, to enable conduction of power from the battery assembly 30 to the radio unit 20. Thus, the light assembly 10 is designed to be easily integrated with existing G.E. radio and battery units. Persons of ordinary skill in the art would readily recognize how to construct attachment mechanisms for light assembly 10 to cooperatively and securely mate with radio units and battery assemblies of various manufacture.

Figure 4:
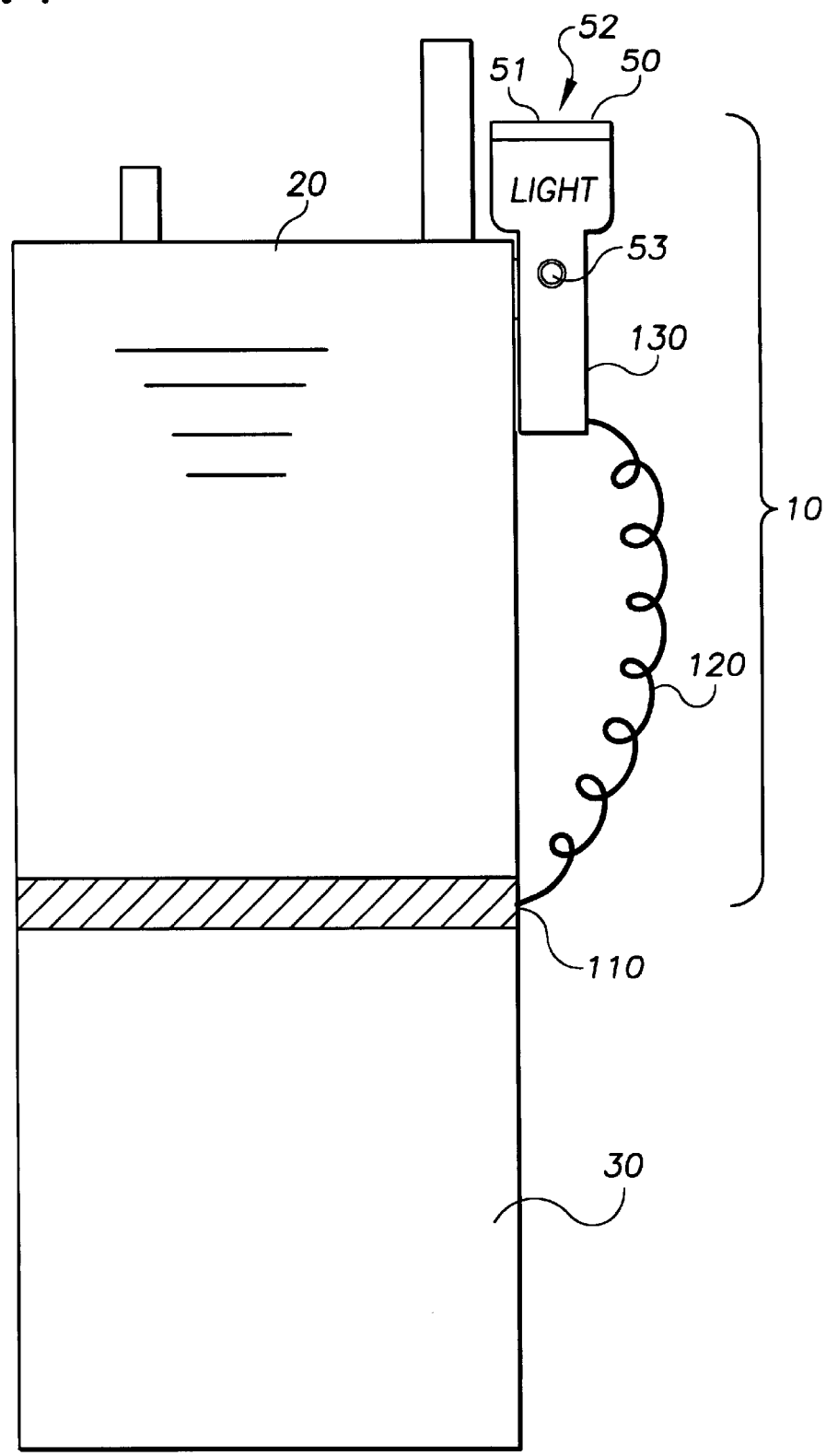
FIG. 4 is a drawing showing yet another embodiment of the light assembly.

Turning now to FIG. 4, there is illustrated another embodiment of the light assembly 10 of the present invention. The light assembly 10 is attached to the radio unit 20 and the battery pack assembly 30. The light assembly 10 includes a light assembly adapter 110 and a lighting device 130 connected to the light assembly adapter 110 by an electrical cord 120. Although not shown, the light assembly adapter 110 essentially incorporates all of the electrical contacts 11, 12 and the attachment mechanism 25b, 26b, 35b of the light assembly 10 of FIGS. 1–3, but without the lighting mechanism, such as the light source 50, the reflector 51, the lens 52 and the on/off switch 53, of the light assembly 10 of FIG. 1. For simplicity, elements shown in FIG. 4 corresponding to those shown in FIG. 1 are denoted by the same reference numerals and their description is omitted.

Although not shown in FIG. 4, the light assembly adapter 110 is operable to be removably attachable to the radio unit 20 and its corresponding battery pack assembly 30, as shown in FIG. 1 for the light assembly 10. The first set of contacts 11 of the light assembly adapter 110 (not shown) are position to make electrical contact with the set of contacts 21 of radio unit 20 when the radio unit 20 is attached to the light assembly adapter 110. The second set of contacts 12 of the light assembly adapter 110 (not shown) are position to make electrical contact with the set of contacts 31 of the battery pack assembly 30 when the battery assembly 30 is attached to the light assembly adapter 110. Internal to the light assembly adapter 110, first set of contacts 11 are electrically connected to the second set of contacts 12, to enable conduction of power from the battery assembly 30 to the radio unit 20. Thus, the light assembly adapter 110 is designed to be easily integrated with existing radio and battery units. Persons of ordinary skill in the art would readily recognize how to construct attachment mechanisms for light assembly adapter 110 to cooperatively and securely mate with radio unit and battery assembly of various manufacture.

Although not shown in FIG. 4, the lighting device 130 essentially incorporates all of the lighting mechanism 50, 51, 52, 53 of the light assembly 10 of FIG. 1, but without the electrical contacts 11, 12 and the attachment mechanism 25b, 26b, 35b of the light assembly 10 of FIGS. 1–3. Preferably, the lighting device 130 being removably attachable to the radio unit 20 by a fastener, a hook, a velcro strap or other comparable means. For simplicity, elements of the lighting device 130 corresponding to those elements of the light assembly 10 as shown in FIG. 1 are denoted by the same reference numerals and their discussion is omitted.

Alternatively, the light assembly adapter 110 includes a light assembly power source 60 (not shown) that is compatible with the power requirements of both the lighting device 130 and the radio unit 20. When the light assembly adapter 110 is attached to the radio unit 20, electrical power from the light assembly power source 60 is conducted to contacts 21 of the radio unit 20 through the first set of contacts 11 of the light assembly adapter 110. In one configuration of the light assembly adapter 110 comprising the light assembly power source 60, the side of light assembly adapter 110 opposite the side of light assembly adapter 110 attachable to the radio unit 20 is sealed by a light assembly package (not shown). The mechanism by which light assembly adapter 110 is attached to the radio unit 20 is designed to be substantially identical to the mechanism by which the battery pack assembly 30 is attached to the radio unit 20. Accordingly, the light assembly adapter 110 may be removed and replaced by the battery pack assembly 30 which was designed therefor.

In accordance with another embodiment, the light assembly adapter 110 having the internal power source 60 may be removably attachable to both the battery pack assembly 30 and the radio unit 20. In this configuration of the light assembly adapter 110, the internal power source 60 can provide power to the lighting device 130 while the battery pack assembly 30 provides power to the radio unit 20. Further, a switch (not shown) can be provided to select either the internal power source 60 or the battery pack assembly 30 to provide power to the lighting device 130, to the radio unit 20, or to both.

Figure 5:
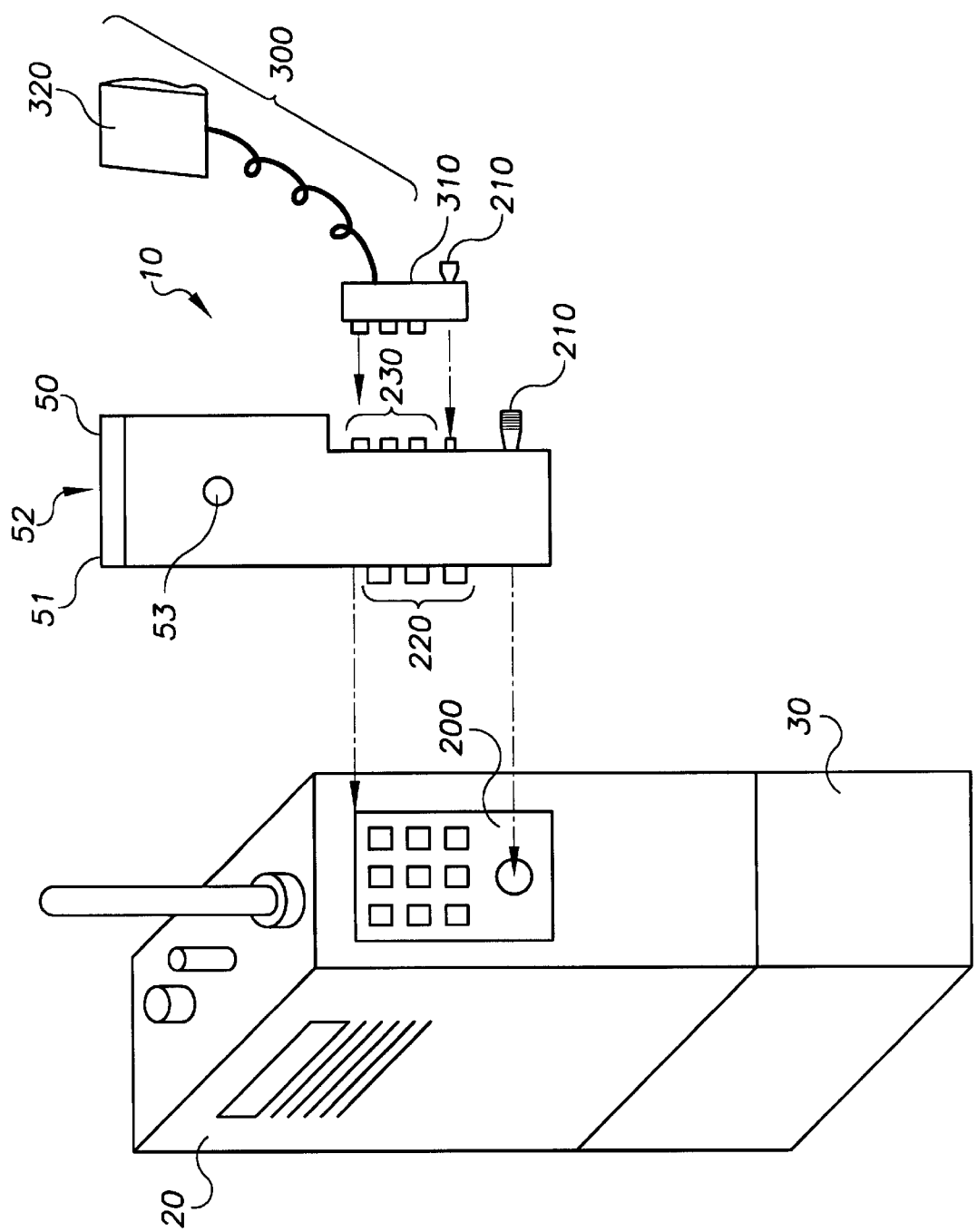
FIG. 5 is a drawing showing still another embodiment of the light assembly.

Turning now to FIG. 5, there is illustrated yet another embodiment of the light assembly 10 of the present invention. For simplicity, elements shown in FIG. 5 corresponding to those shown in FIG. 1 are denoted by the same reference numerals and their discussion is omitted. The light assembly 10 is removable attachable to a universal connector 200 of the radio unit 20. The mechanism for attaching the light assembly 10 to the universal connector 200 of the radio unit 20 is substantially identical to the mechanism for attaching a remote radio accessory 300, such as a public safety microphone, remote headset, etc. The first set of contacts or terminals 220 of the light assembly 10 are designed to cooperatively mate with the universal connector 200 on the radio unit 20. The first set of terminals 220, as shown in FIG. 5, are positioned to make electrical contact with the universal connector 200 of the radio unit 20 when the light assembly 10 is attached to the radio unit 20.

The light assembly 10 additionally includes a set screw 210 which is tightened to securely mate the first set of terminals 220 with the universal connector 200 on the radio unit 20. Conversely, the set screw 210 is loosened to release the light assembly 10 from the radio unit 20.

Preferably, the light assembly 10 includes a second set of terminals or universal connector 230 for removably attaching the remote radio accessory 300. The second set of terminals 230 of the light assembly 10 is designed so that the remote radio accessory 300 connects to the light assembly 10 and the radio unit 20 substantially in the same manner. Typically, the remote radio accessory 300, such as a public safety microphone, comprises a microphone 320 and a set of terminals 310 for removably attaching the remote radio accessory 300 to the universal connector 200 of the radio unit 20.

The set of terminals 310 of the remote radio accessory 300, as shown in FIG. 5, are positioned to make electrical contact with the second set of terminals 230 of the light assembly 10. Internal to the light assembly 10, the first set of terminals 220 are electrically connected to the second set of terminals, to enable conduction of power from the radio unit 20 to the remote radio accessory 300. Thus, the light assembly 10 is designed to be easily integrated with existing radio unit 20 and the remote radio accessory 300. Persons of ordinary skill in the art would readily recognize how to construct attachment mechanism for light assembly 10 to cooperatively and securely mate with the radio unit and remote radio accessory of various manufacture.

Alternatively, the light assembly 10 includes an internal power source 60 (not shown) that is compatible with the power requirements of both the light assembly 10 and the radio unit 20. When the light assembly 10 is attached to the radio unit 20, electrical power from the internal power source 60 is conducted to the universal connector 200 of the radio unit 20 through the first set of terminals 220 of the light assembly 10. In one configuration of the light assembly 10 comprising the light assembly power source 60, the side of light assembly 10 opposite the side of light assembly 10 attachable to the radio unit 20 is sealed by a light assembly package (not shown). Preferably, the electrical power from the internal power source 60 is also conducted the second set of terminals 230 of the light assembly 10 to thereby provide electrical power to the remote radio accessory 300 connected to the light assembly 10.

In yet still another embodiment, the light assembly 10 having the internal power source 60 may be removably attached to the radio unit 20 having a removably attachable battery pack assembly 30. In this configuration of the light assembly 10, the internal power source 60 can provide power to the light source 50 while the battery pack assembly 30 provides power to the radio unit 20. Further, a switch (not shown) can be provided to select either the internal power source 60 or the battery pack assembly 30 to provide power to the light assembly 10 (and to any remote radio accessory 300 removably attached to the light assembly 10), to the radio unit, or to both.

While the present invention has been particularly shown and described with reference to a preferred embodiment, it will be readily appreciated that various changes may be made without departing from the spirit and scope of the invention.

It is intended that the appended claims be interpreted as including the embodiments discussed above with reference to the drawings, those various alternatives which have been described and all equivalents thereto.

What is claimed is:

1. A light assembly comprising a light assembly adapter having one side removably attachable to a radio unit and a second side removably attachable to a battery pack assembly; and a lighting device electrically connected to said adapter.

2. The light assembly of claim 1, wherein said battery pack assembly provides power to said lighting device and said radio unit.

3. The light assembly of claim 1, wherein said adapter includes an internal power source for providing power to said lighting device.

4. The light assembly of claim 3, wherein said internal power source provides power to said radio unit.

5. The light assembly of claim 3, wherein said battery pack assembly provides power to said radio unit.

6. The light assembly of claim 3, further comprising a switch to select either said internal power source or said battery pack assembly to provide power to said lighting device.

7. The light assembly of claim 3, further comprising a switch to select either said internal power source or said battery pack assembly to provide power to said radio unit.

8. The light assembly of claim 3, further comprising a switch to select either said internal power source or said battery pack assembly to provide power to said lighting device and said radio unit.

9. The light assembly of claim 1, wherein said lighting device being removably attachable to said radio unit.

10. Apparatus comprising a light assembly having a light assembly adapter having first and second sides and a lighting device electrically connected to said adapter, a radio unit, and a battery pack assembly; wherein said first side of said adapter being removably attachable to said radio unit and said second side of said adapter being removably attachable to said battery pack assembly.

11. The apparatus of claim 10, wherein said light adapter includes an internal power source for providing power to said lighting device.

12. The apparatus of claim 11, wherein said internal power source provides power to said radio unit.

13. The apparatus of claim 11, wherein said battery pack assembly provides power to said radio unit.

14. The apparatus of claim 10, wherein said battery pack assembly provides power to said lighting device.

15. The apparatus of claim 10, wherein said lighting device being removably attachable to said radio unit.

16. A light assembly housing a light source, said light assembly being removably attachable to a universal connector of a radio unit, and a battery pack assembly being removably attachable to said radio unit.

17. The light assembly of claim 16, further comprising a universal connector for removably attaching a remote radio accessory.

18. The light assembly of claim 17, wherein said battery pack assembly provides power to said light assembly and said radio unit.

19. The light assembly of claim 18, wherein said battery pack assembly provides power to said remote radio accessory.

20. The light assembly of claim 17, further comprising an internal power source for providing power to said light source and said remote radio accessory.

21. The light assembly of claim 20, wherein said internal power source provides power to said radio unit.

22. Apparatus comprising a light assembly housing a light source, a radio unit having a universal connector and a battery pack assembly removably attachable to said radio unit, wherein said light assembly being removably attachable to said universal connector of said radio unit.

23. The apparatus of claim 22, wherein said light assembly includes a universal connector for removably attaching a remote radio accessory.

24. The apparatus of claim 23, wherein said battery pack assembly provides power to said light assembly and said radio unit.

25. The apparatus of claim 24, wherein said battery pack assembly provides power to said remote radio accessory.

26. The apparatus of claim 23, wherein said light assembly includes an internal power source for providing power to said light source and said remote radio accessory.

27. The apparatus of claim 26, wherein said internal power source provides power to said radio unit.

* * * * *